United States Patent
van Hoff et al.

(10) Patent No.: US 9,665,236 B2
(45) Date of Patent: *May 30, 2017

(54) USER CUSTOMIZABLE VIEWS OF MULTIPLE INFORMATION SERVICES

(71) Applicant: Dell Products, L.P., Round Rock, TX (US)

(72) Inventors: Arthur Anthonie van Hoff, Menlo Park, CA (US); Mark Andrew Ross, San Carlos, CA (US); Timothy Bucher, Geyserville, CA (US)

(73) Assignee: Dell Products L.P., Round Rock, TX (US)

( * ) Notice: Subject to any disclaimer, the term of this patent is extended or adjusted under 35 U.S.C. 154(b) by 56 days.

This patent is subject to a terminal disclaimer.

(21) Appl. No.: 14/496,940

(22) Filed: Sep. 25, 2014

(65) Prior Publication Data

US 2015/0033124 A1  Jan. 29, 2015

Related U.S. Application Data

(63) Continuation of application No. 12/259,884, filed on Oct. 28, 2008, now Pat. No. 8,892,760.

(51) Int. Cl.
| | | |
|---|---|---|
| *G06F 15/16* | (2006.01) | |
| *G06F 3/0481* | (2013.01) | |
| *H04N 21/431* | (2011.01) | |
| *H04N 21/485* | (2011.01) | |
| *G06F 3/0484* | (2013.01) | |
| *H04L 29/06* | (2006.01) | |
| *H04N 21/414* | (2011.01) | |
| *H04N 21/462* | (2011.01) | |

(52) U.S. Cl.
CPC ........ *G06F 3/0481* (2013.01); *G06F 3/04842* (2013.01); *H04L 65/60* (2013.01); *H04N 21/431* (2013.01); *H04N 21/4858* (2013.01); *H04N 21/41407* (2013.01); *H04N 21/4622* (2013.01)

(58) Field of Classification Search
CPC ............. H04N 21/431; H04N 21/4858; H04N 21/41407; H04N 21/4622; G06F 3/04842; G06F 3/0481; H04L 65/60
USPC ........................................................ 709/231
See application file for complete search history.

(56) References Cited

U.S. PATENT DOCUMENTS

| | | | |
|---|---|---|---|
| 6,100,890 A | 8/2000 | Bates et al. | |
| 7,673,327 B1 * | 3/2010 | Polis ................... | G06F 17/3089 713/151 |
| 2003/0070167 A1 | 4/2003 | Holtz et al. | |
| 2004/0148157 A1 | 7/2004 | Horn et al. | |
| 2006/0257053 A1 | 11/2006 | Boudreau et al. | |

(Continued)

*Primary Examiner* — Joseph Greene
(74) *Attorney, Agent, or Firm* — Brian Tucker; Kirton McConkie

(57) ABSTRACT

A user configurable interface view can be generated for a media device or other information handling system that is independent of any interface views defined by media content providers. Generating the user configurable interface view includes identifying content data streams that are included in user interface views defined by the media content providers and then selecting a desired subset of the data content streams. The selected data content streams are then aggregated and the user configurable interface view is generated. The resulting user interface view will be independent of any interface views defined by the media content providers.

20 Claims, 7 Drawing Sheets

(56) References Cited

U.S. PATENT DOCUMENTS

2008/0184117 A1* 7/2008 Alsbury ............... G06Q 30/02
715/719
2008/0301570 A1 12/2008 Milstead et al.
2009/0306985 A1* 12/2009 Roberts ............... G10L 13/043
704/258
2011/0179078 A1 7/2011 Boerries et al.

\* cited by examiner

USER CUSTOMIZABLE VIEWS OF MULTIPLE INFORMATION SERVICES

CROSS-REFERENCE TO RELATED APPLICATIONS

This application is a continuation of U.S. patent application Ser. No. 12/259,884 which was filed on Oct. 28, 2008.

BACKGROUND

1. The Field of the Invention

The present invention relates generally to media devices including portable media devices. More specifically, embodiments of the present invention relate to methods and systems for interfacing media devices with media content providers.

2. The Relevant Technology

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One of the advantages afforded by technological improvements is the ability to distribute digital media. However, the ability of information handling systems to present digital media information has not kept pace with the ways in which digital media information can be distributed, the wide variety of digital media, or with the growing diversity among media devices.

For example, digital media information (e.g., music, video, Internet data, sports data, news data, weather data, etc.) can be distributed to media devices via various networks including the Internet as well as wireless communication, such as satellite radio, WiFi, cellular networks, and the like. Given the diversity of media devices and media content, many different types of devices have been developed to enjoy the growing availability of digital media information. Examples of media devices may include MP3 players, portable CD players, portable DVD players, notebook computers, cellular telephones, personal digital assistants (PDAs) and the like. Digital media information can also be enjoyed on non-portable devices as well such as on desk top computers.

Oftentimes, a user desires to access specific content for the media devices. Typically a user accesses a media content provider and then navigates through various interfaces defined by the media content provider to select the desired content. As will be appreciated, this may be time consuming when the user desires to access a large number of different content. Further, the user's view of the content is controlled by the content provider. While this may be desirable from the content provider's perspective, the user typically would like to have an alternative view of the content that is based on his or her preferences and desired categorization.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An embodiment disclosed herein relates to a method for a media device to generate a view of a user configurable interface configured to show certain content or services. Embodiments of the invention can are scalable and can be practiced in systems where multiple media devices receive content and/or services from multiple media content providers. The method comprises identifying one or more content data streams included in one or more interface views defined by one or more media content providers of the one or more content data streams, selecting at least a portion of the identified content data streams that are to be included in a user configurable interface view, aggregating the selected portion of the content data streams from the one or more interface views, and generating the user configurable interface view, wherein the user configurable interface view lists at least a link or pointer to the aggregated content data streams independent of the interface views defined by the one or more media content providers.

Another embodiment disclosed herein relates to a method for generating a view of a user configurable interface configured to show user selected content or services. This method may be practiced in a system including one or more media devices that receive content or services from one or more media content providers. The method comprises identifying one or more content data streams included in one or more interface views defined by one or more media content providers of the one or more content data streams in response to receiving a request from a media device, selecting at least a portion of the identified content data streams that are to be included in a user configurable interface view, aggregating the selected portion of the content data streams from the one or more interface views, generating the user configurable interface view, wherein the user configurable interface view lists at least a link or pointer to the aggregated content data streams independent of the interface views defined by the one or more media content providers, and providing the generated configurable interface view to the media device.

A further embodiment disclosed herein relates to a media device configured to generate a user configurable interface view. The device comprises a memory, a processing unit, a user interface, a selection module configured to select one or more content data streams included in one or more interface views defined by one or more media content providers of the one or more content data streams, and an aggregation module configured to aggregate the selected content data streams from the one or more interface views and generate the user configurable interface view, wherein the user configurable interface view lists at least a link or pointer to the aggregated content data streams independent of the interface views defined by the one or more media content providers Additional features and advantages will be set forth in the description which follows, and in part will be obvious from the description, or may be learned by the practice of the teaching herein. The features and advantages of the teaching herein may be realized and obtained by means of the instruments and combinations particularly pointed out in the appended claims. These and other features will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

In the following detailed description, reference is made to the accompanying drawings which form a part hereof, and in which are shown by way of illustration specific embodiments in which the invention may be practiced. It is to be understood that other embodiments may be utilized and structural changes may be made without departing from the scope of the present invention For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Embodiments of the invention relate to systems and methods for generating a user configurable interface view for a media device or other information handling system that may be independent of any interface views defined by media content providers. Generating the user configurable interface view includes identifying content data streams that are included in user interface views defined by the media content providers and then selecting a desired subset of the data content streams. The selected data content streams are then aggregated and the user configurable interface view is generated. The resulting user interface view will be independent of any interface views defined by the media content providers.

Figure 1:
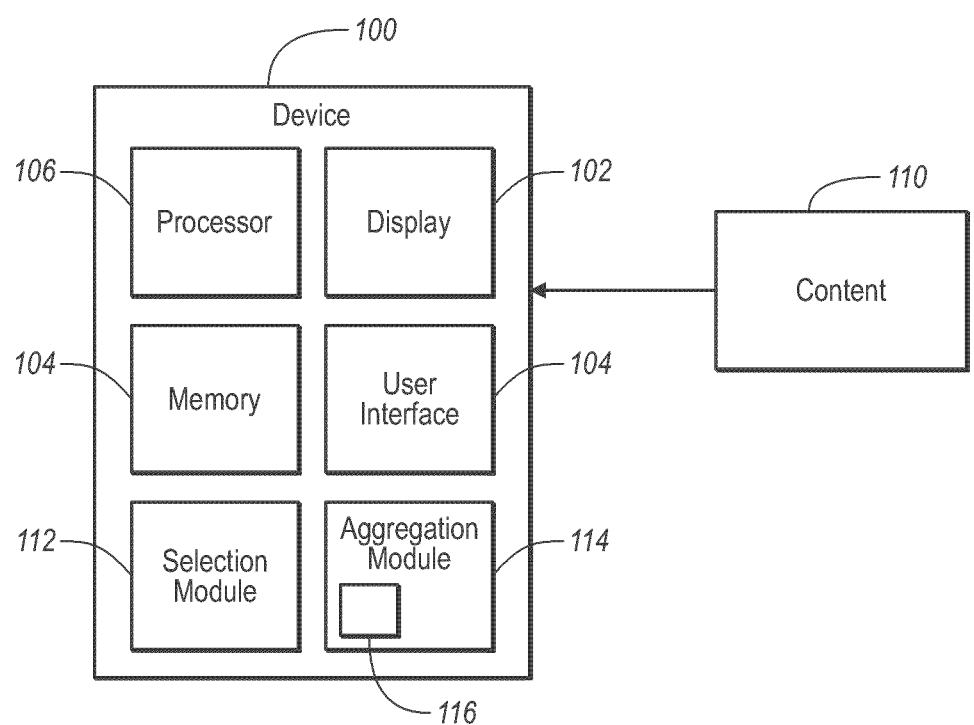
FIG. 1 illustrates one embodiment of a schematic drawing of a media device.

FIG. 1 illustrates an embodiment of a media device 100 that can receive content including digital media from one or more content providers or other sources. Examples of the media device 100 may include, by way of example, a satellite radio media device, a portable audio player such as an MP3 player or the like, a portable DVD or CD player, a personal computer, a server computer, a laptop computer, a cellular telephone, a personal digital assistant (PDA), and the like or any combination thereof. Embodiments of the invention may be practiced in portable media devices, but one of skill in the art can appreciate that embodiments of the invention can be used with other media devices able to receive and render media content.

Typically, the media device 100 includes a display 102 that can visually convey information to the user of the device. For example, when the media device 100 renders digital audio data, the display 102 may indicate the song title, the artist, the album title, the track number, the length of the track, and the like or any combination thereof. The media device 100 also includes a user interface 104 (such as control buttons, touch screen, capacitive input, etc.) or other means of providing input to the media device 100. The user interface 104, by way of example, enables a user to navigate and activate the digital media and other content that is stored on the memory 108 of the media device 100 or to navigate and perform any digital media or content that is received from an external source. The user interface 104 may enable a user to switch to another channel, such as in satellite radio, or otherwise select media content. The user interface 104 also allows a user to navigate menus or other information presented on the display 102.

The media device 100 may further include a processor 106. The processor 106 by way of example, enables media device 100 to execute various programs as circumstances warrant. In addition, the processor 106 may be utilized by one or more of the other modules or elements of media device 100 for processing operations.

The memory 108 of the media device, which may include volatile and non-volatile memory or any combination thereof, can be used to store content or other user and/or device data. The memory 108, for example, may store digital music and/or video, graphics, play lists, user preferences, device settings, and the like or any combination thereof.

The content 110 represents different types of media including digital media that may be received by the media device 100. Examples of the content 110 include, but are not limited to, digital music, talk audio data, television data, movie data, podcasts, sports data, weather data, news data, Internet data, and the like or any combination thereof. The content 110 may be associated with different rights or may have different quality levels. Some of the content 110 may be owned by a user, rented, recorded live, streamed, and the like. In addition, the content 110 can be either digital or analog in nature. In some embodiments, the content 110 is stored in memory 108 prior to be accessed by a user of the media device 100. In other embodiments, the content 110 is received dynamically by the media device 100 at the time the user of the media device desires to access the content.

Figure 2:
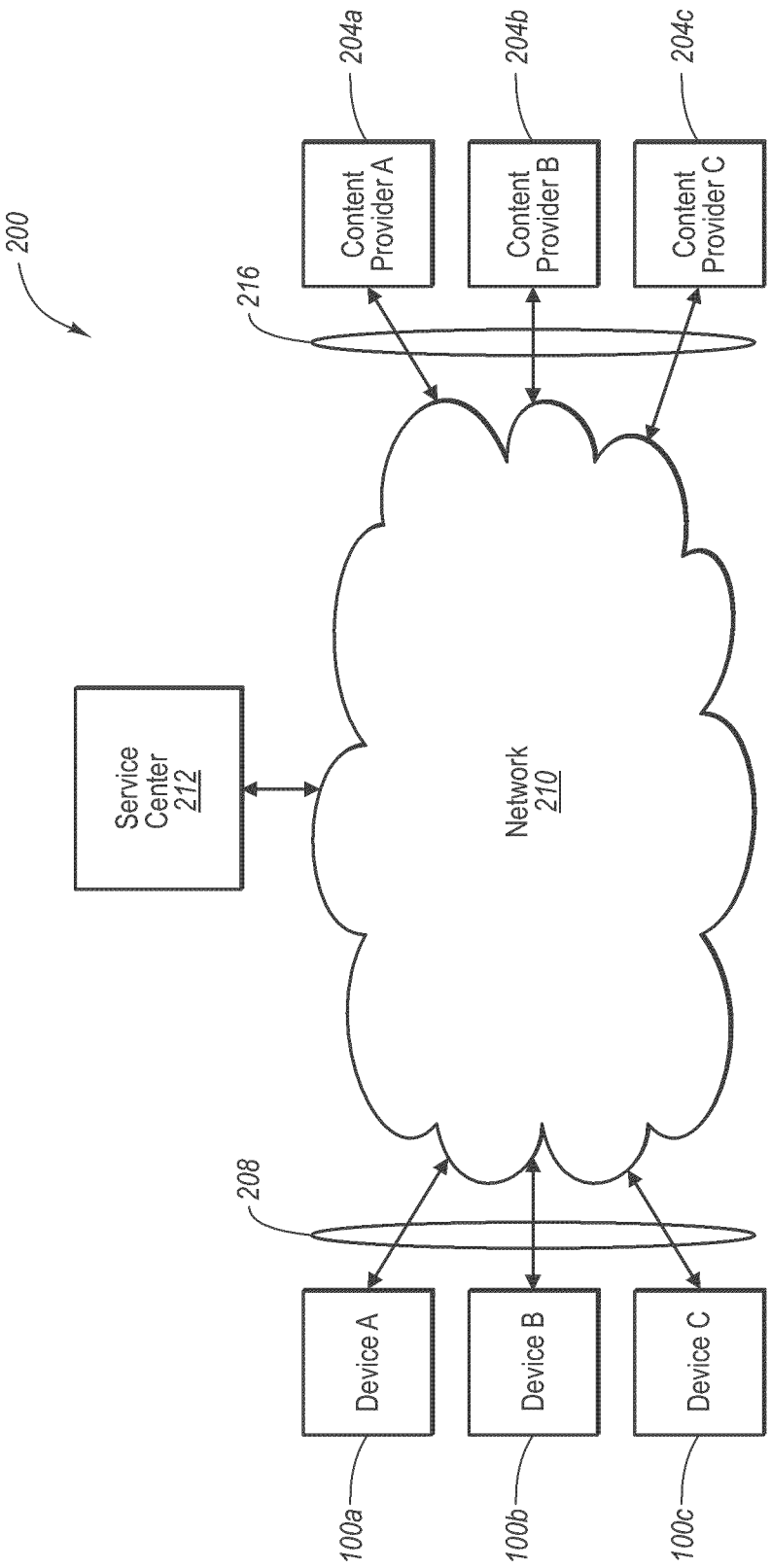
FIG. 2 illustrates one embodiment of a system including a service center, media devices, and media content providers.

FIG. 2 illustrates one example of an environment for implementing embodiments of the present invention. FIG. 2 includes a system 200 for enabling multiple media devices 100 a, 100 b and 100 c (collectively media devices 100) to receive one or more services from the media content providers 204 a, 204 b and 204 c. The system 200 also includes a service center 212, which may be executing on server computer(s), for interfacing between the media devices 100 and the media content providers 204. The service center 212 may communicate with the media devices 100 directly, or through a network 210, as illustrated in FIG. 2. Likewise, the service 212 may communicate with the media content providers 204 directly, or through the network 210, as further illustrated in FIG. 2.

The media devices 100 a, 100 b, and 100 c may include, for example, any of the media devices described in reference to FIG. 1. The media content providers 204 are representative of media sources providing digital media that may be received by the media devices 100. The media content providers 204 may be sources through which a user may obtain music or audio data, Internet data, video data, podcasts, text data, and the like or any combination thereof. Exemplary media content providers 204 may include, by way of example, satellite sources including digital radio and video, terrestrial sources, internet service providers, music downloads services, peer to peer networks, and the like or any combination thereof. The media content providers 204 may include free services, that is services that may be accessed free of charge. Alternatively, the media content providers 204 may include pay services that may only be accessed by clients who are billed a predetermined amount, for example, a monthly charge, or a charge that is based on volume of usage or based on user selections. Furthermore, the media content providers 204 may either provide open access to the public, or may require user authentication. As will be appreciated, for those media content providers that require user authentication, no content or services will be provided to a media device that does not provide the proper authentication.

The network 210 is representative of any network that is compatible with the media devices 100 or the media content providers 204 and may include, by way of example, satellite networks, 802.11 networks, personal computer networks (e.g., LAN, WAN), wireless networks (e.g., Bluetooth, WiFi), cellular networks, telephony networks (e.g., landline or PSTN), data networks, the Internet, and the like or any combination thereof.

The service center 212 receives data streams 208 from the media devices 100, and likewise receives data streams 216 from the media content providers 204. Exemplary data streams 208 and 216 include, by way of example, wired and wireless computer networks (LAN, WAN, Internet, WiFi, WiMax, EVDO, Edge Networks, GPRS, and the like), satellite signals, terrestrial signals, and the like or any other reasonable data stream.

Although illustrated as a single entity, the service center 212 can be implemented in a distributed computing environment where tasks are performed by local and remote processing devices that are linked (either by hardwired links, wireless links, or by a combination of hardwired and wireless links) through a communications network. Additionally, the service center may store information about the media devices 100 so that the devices may receive one or more services or content from the media content providers.

As previously mentioned, the media devices 100 include a user interface 104 that is configured to allow a user to view the received content 110 and to navigate through the content. For example, referring to FIGS. 3A-3G (also referred to as FIG. 3), several views of an interface are shown by way of example only. It will be appreciated that the interfaces of FIG. 3 may include more or less elements than are illustrated and still be within the scope of the embodiments disclosed herein.

Figure 3A:
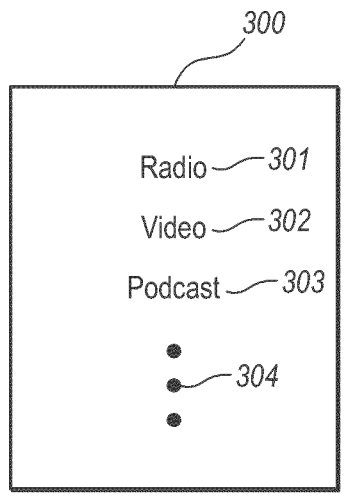
FIGS. 3A-3G illustrate various interface views in accordance with embodiments disclosed herein.

FIG. 3A illustrates a first interface 300. The first interface shows a listing of various types of content that may be accessed by a media device 100. The content can be stored on the device, or may be accessed over a network. Further, embodiments of the invention generate views that combine the types of content that may be accessed from a particular interface. For instance, the listing illustrated in FIG. 3A includes radio 301, video 302, and podcasts 303 as types of content a user may desire to view. The listing also includes ellipses 304 that represent there may be numerous other types of content that are also listed.

Figure 3B:
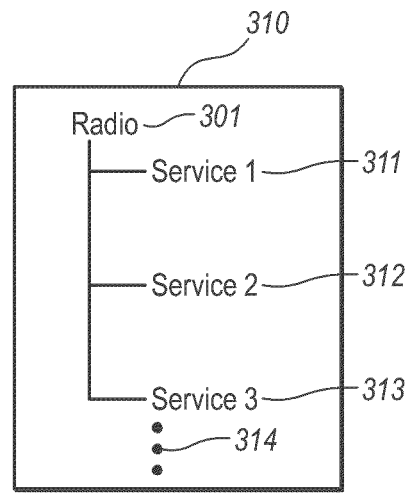

In operation, a user may navigate through the listing of interface 300 to select the type of content he or she desires to access. For instance, if the user desires to access radio content, such as music and talk content, the user would select radio 301. The user interface would then show the interface illustrated in FIG. 3B. FIG. 3B shows an interface 310 that includes a listing of various radio services 311, 312, and 313 that may be accessed. The listing of interface 310 also includes ellipses 314 that represent there may be numerous other radio services available to the user. In some embodiments, the services 311, 312, and 313 may be provided by different content providers. Embodiments of the invention thus allow the generation and presentation of user interfaces that include data streams or content from multiple content providers at the same time in the same interface.

Figure 3C:
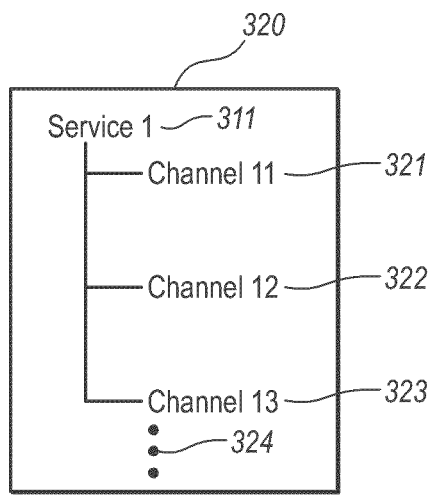

The user may then navigate through the listing of interface 310 to select a desired radio service. If the user selected service 311 (also illustrated as service 1), the user interface may show the interface 320 illustrated in FIG. 3C. FIG. 3C shows an interface 320 that includes a listing of various channels or data streams 321, 322, 323 that are provided by service 311. For instance, channel 321 (also illustrated as channel 11) may provide a type of music content such as songs from the 1980s. Channel 322 (also illustrated as channel 12) may provide sports talk content. Channel 323 (also illustrated as channel 13) may provide music content such as contemporary songs. The listing of interface 320 also includes ellipses 324 that represent there may be numerous other channels available from service 311.

Unlike the interfaces of FIGS. 3A and 3B, however, the interface 320 of FIG. 3C may be associated with a service provider. In other words, the provider of service 311 specifies the rules and the like that govern how the channels 321-324 are shown and how the user navigates to each channel to select a desired channel.

For example, in one embodiment, the interface 320 may correspond to a web-based interface or the like that a user would access when communicating directly with a provider of service 311, such as media content provider 204 a. The media device 100 provides a view of this interface to the user of media device 100. In some embodiments, this interface is received as part of content 110 and stored in memory 108 until accessed by the user. In other embodiments, the interface may be dynamically received from the media content provider 204 *a* at the time the user selects service 311 with the device interface 104.

In operation, once the interface 320 is viewable by the user of media device 100, the user may navigate to a desired channel of service 311 using the rules specified by the interface. For instance, if the user desired to listen to music from the 1980s, then the user would select channel 321. Once selected, the channel 321 would provide the music to the listener. As with the interface 320, in some embodiments, the various channels 321-324 may be received as content 110 from media content provider 204 *a* and stored in memory 108 and may then be accessed when the user selects a particular channel. In other embodiments, the selected channels 321-324 may be dynamically accessed at the time of selection.

Figure 3D:
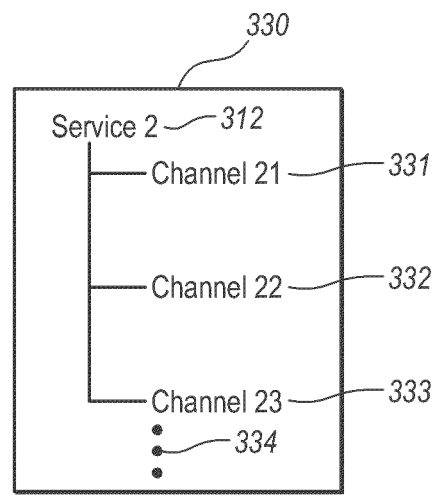

FIG. 3D shows an interface 330 that is accessed when the user selects service 312 (also illustrated as service 2), in interface 310. It will be appreciated that the service 312 will typically be provided by a media content provider 204 that is different from the media content provider that provides service 311. The interface 330 includes a listing of various channels or data streams 331 (also illustrated as channel 21), 332 (also illustrated as channel 22), 333 (also illustrated as channel 23) that are provided by service 312. The channels 331, 332, and 333 may provide, by way of example only, music or talk content unique to the given channel. The listing of interface 330 also includes ellipses 334 that represent there may be numerous other channels available from service 312.

As with interface 320, interface 330 is typically defined by the service provider, and may correspond to a web-based interface or the like that a user would access when communicating directly with a provider of service 312, such as media content provider 204 *b*. In operation, the user may navigate to a desired channel of service 312 using the rules specified by the interface. As discussed previously, the selected channel provides its content, which may either be stored in memory 108 or may be dynamically provided by media content provider 204 *b*.

Figure 3E:
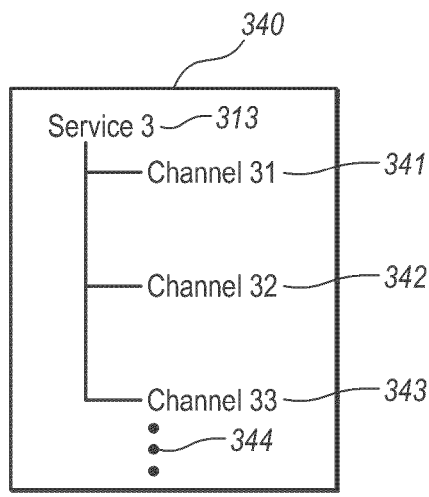

FIG. 3E shows an interface 340 that is accessed when the user selects service 313 (also illustrated as service 3), in interface 310. It will be appreciated that the service 313 will typically be provided by a media content provider 204 that is different from the media content provider that provides services 311 or 312. The interface 340 includes a listing of various channels or data streams 341 (also illustrated as channel 31), 342 (also illustrated as channel 32), 343 (also illustrated as channel 33) that are provided by service 313. The channels 341, 342, and 343 may provide music or talk content unique to the given channel. The listing of interface 340 also includes ellipses 344 that represent there may be numerous other channels available from service 312.

As with interfaces 320 and 330, interface 340 is typically defined by the service provider, and may correspond to a web-based interface or the like that a user would access when communicating directly with a provider of service 313, such as media content provider 204 *c*. In operation, the user may navigate to a desired channel of service 313 using the rules specified by the interface. As discussed previously, the selected channel provides its content, which may either be stored in memory 108 or may be dynamically provided by media content provider 204 *c*.

Figure 3F:
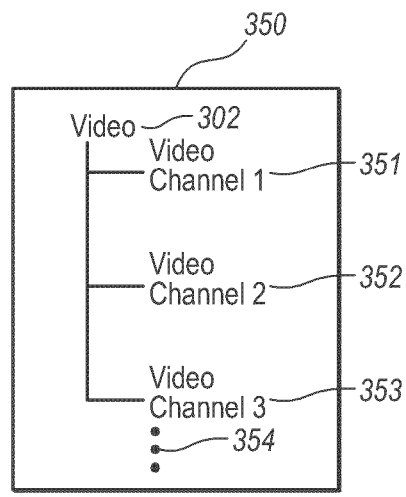
Figure 3G:
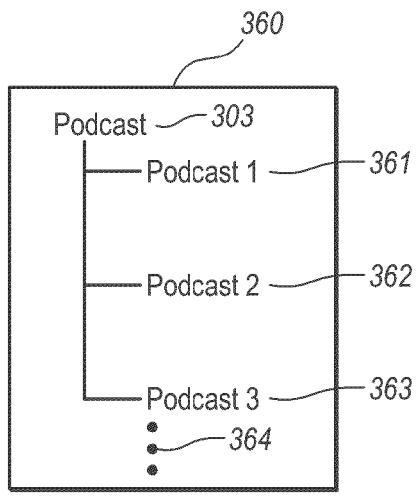

Referring again to FIG. 3A, if the user selected video 302 or podcast 303, then interfaces 350 shown in FIGS. 3F and 360 shown in FIG. 3G may be viewed respectively. These interfaces include various channels or data streams 351-354 and 361-364 respectively. As with interfaces 320, 330, and 340, interfaces 350 and 360 may be defined by the media content provider 204 that provides the services. A user would navigate these interfaces according to the rules specified by the media content provider 204 to access the desired video content or podcast as discussed in relation to interfaces 320, 330, and 340.

As described, the various interfaces of FIG. 3 allow a user to access multiple desired content or services from multiple media content providers 204. However, as described, the user is typically required to access a separate interface for each desired type of content. Conventionally, if a user desires to access radio channel 321, radio channel 331, video channel 351 and podcast 361, he or she must separately navigate to interface 320, 330, 350, and 360 respectively in order to access these channels. Further, the user is limited to the rules specified by the interface provider when accessing the desired content. As will be appreciated, this can be time consuming and may lower the user's listening and/or viewing pleasure.

Advantageously, the embodiments disclosed herein allow for a user defined view or a view that may be generated by the service center 212 of an interface that is configured to list desired data streams from multiple media content providers 204. In addition, the user defined interface is not dependent on the interfaces defined by the media content providers, but rather functions according to its own set of rules.

FIGS. 3A-3G have illustrated an example where the content has been arranged categorically. In some embodiments, the content can be organized in other manners, including by user selection, preference based, content based, and the like or any combination thereof. Advantageously, at least some of the interfaces illustrated in FIG. 3 are not specific to any given content provider, but provide the user with access to content from multiple content providers. Embodiments of the invention allow a user to navigate to select specific content without having to navigate the menus of the various content providers individually.

Referring again to FIG. 1, the media device 100 includes a selection module 112. Selection module 112 may be comprised of software, hardware, or any combination of software and hardware. In some embodiments, selection module 112 may be part of user interface 104. In operation, a user, typically via user interface 104, may select the desired media content that he or she desires to include in a user customizable interface in the manner previously described. Alternatively, the user customizable interface can be configured by the service center and adapt as the user experiences content. In other words, the service center may dynamically adjust the user interfaces to account for user preferences and/or user actions.

For example, the user may access interface 320 and select channel 321 and may access interface 330 and select channel 333. The user may further access interface 340 and select channel 342, access interface 350 and select video channel 351, and access interface 360 and access podcast 362. The selection module 112 then tags or otherwise marks the data streams that have been selected and records this information. These data streams can then be presented in the user interface.

FIG. 1 also illustrates that media device 100 includes an aggregation module 114. Aggregation module 114 may be comprised of software, hardware, or any combination of software and hardware. In operation, aggregation module 114 may then access or receive from selection module 112 the information specifying the data streams that have been selected by the user.

The aggregation module 114 then aggregates all of the selected or tagged data streams and generates a composite view or interface that shows all of the selected data streams from the various services. A user then need only select the data stream that is viewable in the newly generated interface to access the desired content. Advantageously, the generated interface lists a pointer to the exact data stream selected by the user and allows the user to select this data stream without the need for any further navigation as will be explained in more detail to follow.

In some embodiments, the aggregation module 114 includes one or more user configurable rules 116. The rules 116 allow the user to configure the composite view or interface in a way that is desirable to the user. For example, the user configurable rules 116 may allow the user to specify the look and feel of the generated interface. The rules may also allow the user to specify how the listed content items are to be selected and the like. Advantageously, the rules 116 ensure that the generated interface is not subject to the rules defined by the media content provider as discussed previously. Rather, the configurable rules allow the user to define the view.

Figure 4A:
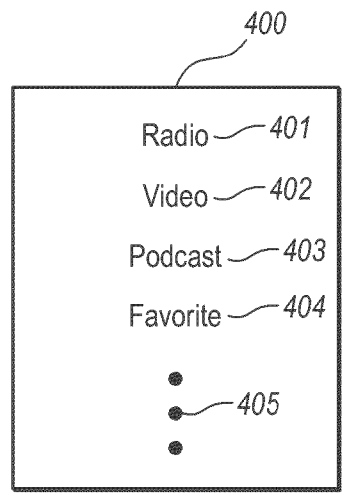
FIGS. 4A-4B illustrate a user configurable interface view in accordance with embodiments disclosed herein.
Figure 4B:
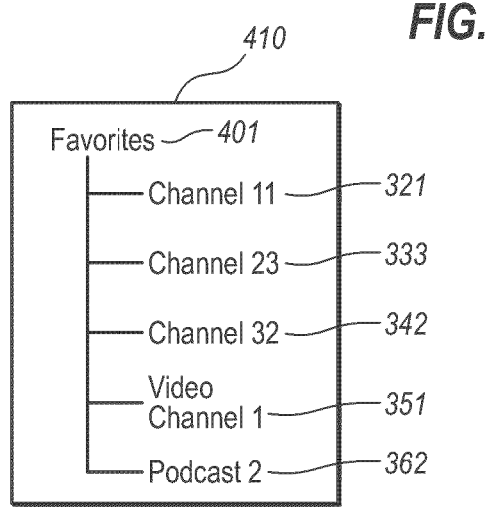

Turning now to FIGS. 4A and 4B (also referred to as FIG. 4), views of the interface generated by aggregation module are illustrated. Referring first to FIG. 4A, an interface 400 is illustrated. The interface 400 is similar to interface 300 of FIG. 3A and shows a listing of the various types of content that may be accessed by a media device 100. For instance, the listing includes radio 401, video 402, and podcasts 403 as types of content a user may desire to view. These may be selected as previously described. However, interface 400 also includes favorites 404 that have been generated by aggregation module 114. The listing also includes ellipses 405 that represent there may be numerous other types of content that are also listed.

If the user selects the favorites 404, then an interface 410 as illustrated in FIG. 4B will be viewable by the user. The interface 410 represents the interface generated by the aggregation module 114. As mentioned above, the interface 410 includes a listing of several data streams from multiple media content providers. In addition, the interface 410 is able to list different types of content.

As illustrated, interface 410 includes a listing that shows channel 321 of service 311, channel 333 of service 312, channel 342 of service 313, video channel 351, and podcast 362. Thus, the interface 410 aggregates multiple content types from multiple media content providers 204 into one user configured interface. As mentioned, the interface 410 is not subject to the rules or navigation defined or established by any media content providers.

In operation, a user who desires to listen to the music or talk content provided by channel 321 need only select this channel to access the content. Once selected, the content of the channel will be provided to the listener. In some embodiments, the content may be previously stored in memory 108 and may be accessed from the memory. In other embodiments, the content of channel 321 will by dynamically accessed at the time of selection. A user need only select the other entries of interface 410 to access those data streams. Advantageously, the user is not required to do any additional navigation before selecting the desired data stream. Further, the interface 410 may only list the actual desired data streams of the available data streams.

Accordingly, the user defined interface 410 is distinct from traditional favorites listings such as web browser favorites for several reasons. For example, a traditional favorites listing typically only lists one type of content, such as a URL in the case of a web browser. The listed URLs would take the user to the designated website, but the user is still typically required to navigate through the webpage to find a desired data stream. As mentioned, interface 410 may list the desired data stream and allows the user to access this without further navigation.

In addition, typical aggregators are only configured to aggregate one type of content. For example, typical aggregators may aggregate similar types of content, but do not aggregate different types of content. However, aggregation module 114 and interface 410 are configured to aggregate different types of content into one view. For example, as illustrated, interface 410 lists three radio channels which provide music and/or talk audio content, a video channel that provides video content, and a podcast channel that provides podcast content. Thus, interface 410 is not limited to any particular type of content, but is able to show numerous different types of content in the user configurable view.

In some instances, the device may interact or rely on the service center 212. As illustrated in FIG. 2, the service center 212 may act as an intermediary between the content providers 204 and the media devices 100. As such, the service center 212 can provide the media devices 100 with the information needed to configure a particular user interface. In addition, the service center 212 may also be able to generate user interfaces dynamically, based on demographics, preferences, and/or the device of a particular user. Further, the interface presented on a particular device is often different from the interfaces presented on other devices.

Figure 5:
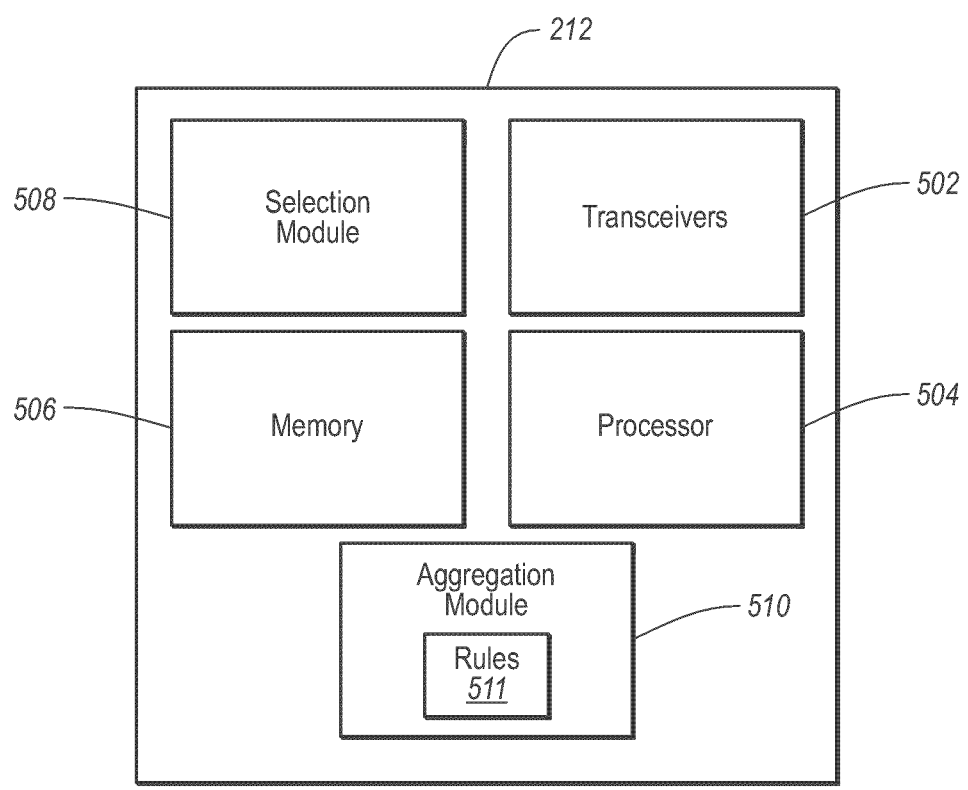
FIG. 5 illustrates an embodiment of a service center.

Referring now to FIG. 5, a more detailed depiction is provided of the service center 212. The service center 212 may include one or more transceivers 502 for transferring data between itself and the media devices and also between itself and the media content providers. The transceivers 502 may include both wired and wireless transceivers for communicating with any of the network 210, media devices 100 and media content providers 204. The service center 212 may further include one or more memory modules 506, which may be volatile or non-volatile memory, for storing data received from the media devices 100 and from the media content providers 204. For instance, the memory 506 may include one or more mapping tables including information about media devices 100 and/or media content providers 204. The interface service 212 may also include a processor 504 configured to provide general purpose processing for the various modules of the service center as circumstances warrant.

In some embodiments, the service center 212 may also include a selection module 508 and an aggregation module 510. The selection module 508 and the aggregation module 510 may be comprised of software, hardware, or any combination of software and hardware. These modules may be configured to generate interface 410 as will now be explained.

In operation, a media device 100 may provide a request to service center 212 that causes the selection module 508 to identify various data streams a user desires to include in the customizable interface. In some embodiments, the request will cause selection module 508 to communicate directly with a media content provider 204. While in communication with the media content provider 204, the selection module 508 may navigate through the media defined interface discussed in relation to FIG. 3 and select desired content data streams. For instance, these data streams may include channel 321 of service 311, channel 333 of service 312, channel 342 of service 312, video channel 350, and podcast 362. The selection module may then tag or otherwise mark the desired data streams.

In alternative embodiments, the selection module 508 may be configured to access media device 100 to identify the desired content data streams in response to the user input. In such embodiments, various module of media device 100, such as selection module 112, may communicate to the selection module 508 the selected data streams.

The identified data streams may then be provided to aggregation module 510. The aggregation module 510 then aggregates all of the selected or tagged content data streams or sources and generates a composite view or interface 410 that shows all of the selected data streams from the various services such as is illustrated in FIG. 4B.

Once the aggregation module has generated the interface 410, this may be provided to the media device 100, where it may be added to the user interface of the media device 100. A user then only need use interface 410 to access the desired content as previously described.

In some embodiments, the aggregation module 510 includes configurable rules 511. The rules 511, in similar manner to the rules 116, allow the user or other device or entity to configure the composite view or interface in a way that is desirable to the user or for a group of users. For example, the configurable rules 511 may allow the user to specify the look and feel of the generated interface. The rules may also allow the user to specify how the listed content data streams are to be selected and the like. Advantageously, the rules 511 ensure that the generated interface is not subject to the rules defined by the media content provider as discussed previously. As will be appreciated, the user will cause the aggregation module 511 to utilize the rules when generating the interface 410.

Figure 6:
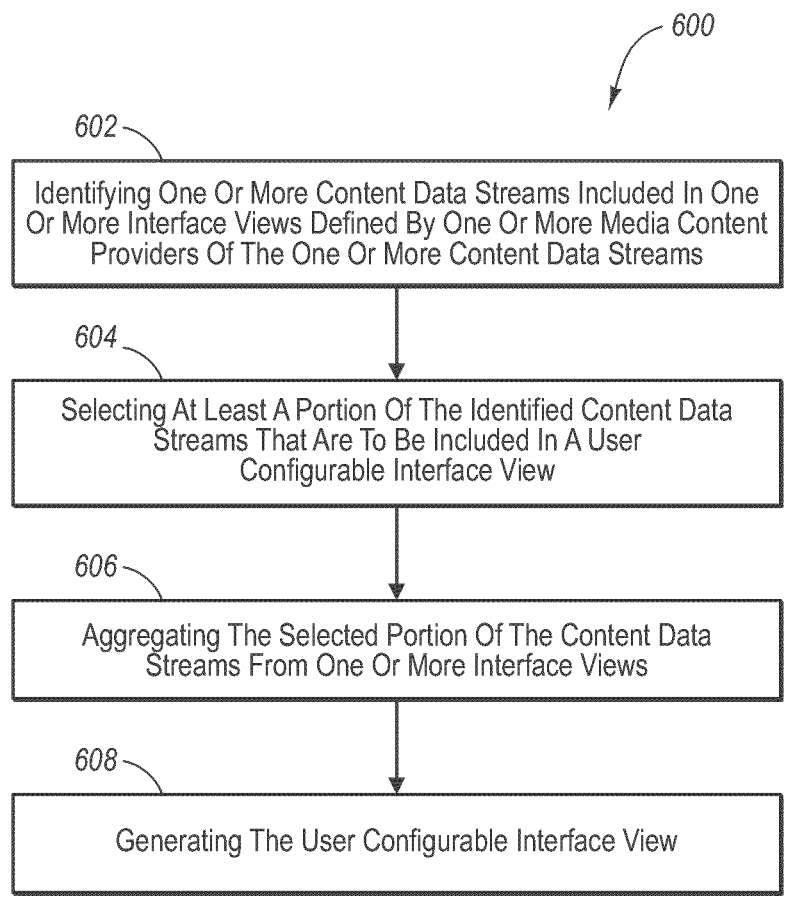
FIG. 6 illustrates a flow chart of a method for a media device to generate a user configurable interface in accordance with embodiments disclosed herein.

Reference is now made to FIG. 6, which illustrates a method 600 for a media device to generate a view of a user configurable interface configured to show user selected content or services. The method 600 may be practiced in a system including one or more media devices that receive content or services from one or more media content providers, although this not required. Further, the method 600 may be practiced in an environment where a particular device is capable of receiving content from multiple content providers.

Method 600 includes identifying 602 one or more content data streams included in one or more interface views defined by one or more media content providers of the one or more content data streams. For example a user may utilize user interface 104 and/or selection module 112 to identify one or more of the content data streams illustrated in the interfaces of FIG. 3. These content data streams may be include the radio channels of services 311-312, the video channels of video service 340, or the podcasts of podcast service 350. As described, these content data streams may be provided by different media content providers 204.

Method 600 also includes selecting 604 at least a portion of the identified content data streams that are to be included in a user configurable interface view. For example, a user may utilize user interface 104 and/or selection module 112 to tag or otherwise mark desired content data streams.

Method 600 further includes aggregating 606 the selected portion of the content data streams from the one or more interface views and generating 608 the user configurable interface view. For example, the aggregation module 114 may aggregate the selected content data streams and may then generate the user configurable interface view. As illustrated by FIG. 4B, the generated user interface 410 includes a listing of at least links or pointers to the selected content data streams. In addition, as discussed above, the interface 410 is independent of the interface views defined by the media content providers 204. Rather, in some embodiments interface 410 is governed by user configurable rules 116 that allow the user to determine the look and feel of the user interface.

Figure 7:
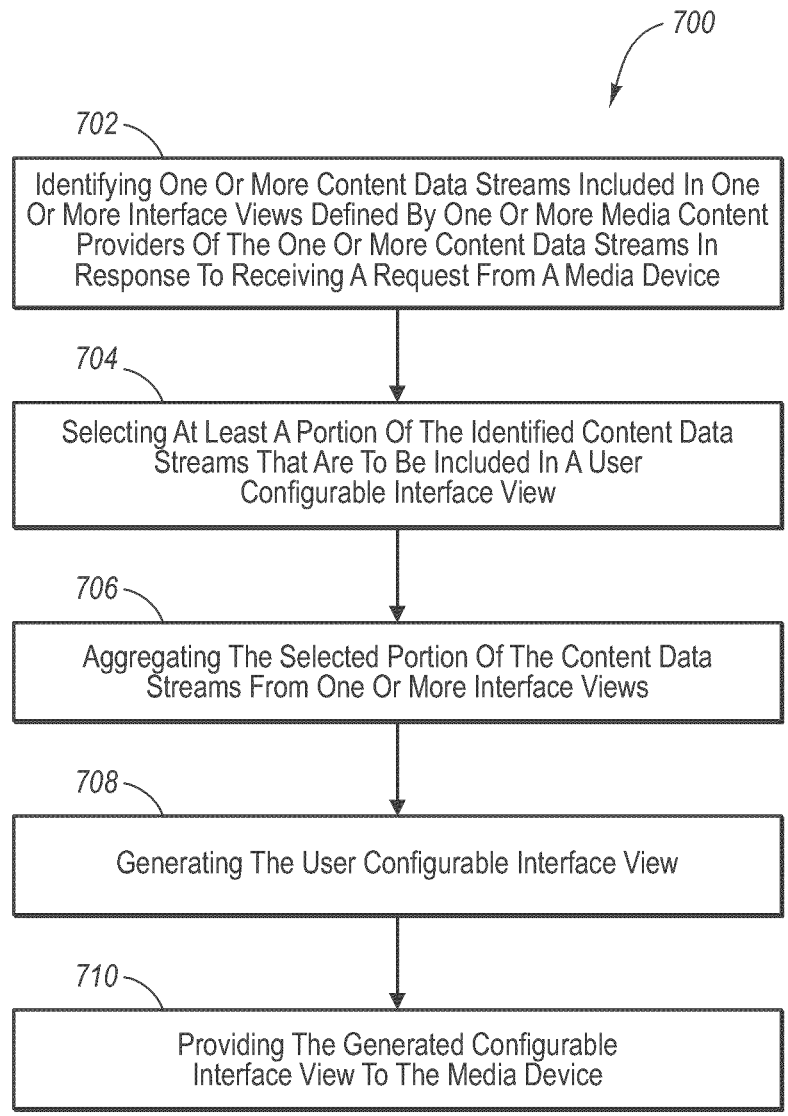
FIG. 7 illustrates a flow chart of a method for a service center to generate a user configurable interface in accordance with embodiments disclosed herein.

Turning now to FIG. 7, a method 700 for generating a view of a user configurable interface configured to show user selected content or services is illustrated. The method 700 may be practiced in a system including one or more media devices that receive content or services from one or more media content providers, although this not required.

Method 700 includes identifying 702 one or more content data streams included in one or more interface views defined by one or more media content providers of the one or more content data streams in response to receiving user input. For example, the service center 212 may receive a request from a media device 100 that causes the service center to identify the content data streams. The user may then utilize selection module 508 to identify the one or more of the content data streams illustrated in the interfaces of FIG. 3. These content data streams may be include the radio channels of services 311-312, the video channels of video service 340, or the podcasts of podcast service 350. As described, these content data streams may be provided by different media content providers 204.

Method 700 also includes selecting 704 at least a portion of the identified content data streams that are to be included in a user configurable interface view. For example, a user may utilize selection module 508 to tag or otherwise mark desired content data streams.

Method 700 further includes aggregating 706 the selected portion of the content data streams from the one or more interface views and generating 708 the user configurable interface view, For example, the aggregation module 114 may aggregate the selected content data streams and may then generate the user configurable interface view. As illustrated by FIG. 4B, the generated user interface 410 includes a listing of at least links or pointers to the selected content data streams. In addition, as discussed above, the interface 410 is independent of the interface views defined by the media content providers 204

Method 700 additionally includes providing 710 the generated configurable interface view to a media device. For example, once it has generated interface 410, the service center 212 may provide the interface 410 to the media device 100. The interface 410 may then be added to the interfaces of the media device 100 as illustrated in FIG. 4A. A user then need only access and utilize the interface 410 to access the listed content data streams as discussed previously.

Embodiments herein may comprise a special purpose or general-purpose computer including various computer hardware. Media devices are examples of special purpose computers. Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. In a system including one or more media devices that receive data streams from a plurality of media content providers, a method for a media device from amongst the one or more media devices to generate a custom user interface configured to display selected data streams available to be streamed to the media device, the method comprising:
    displaying, on a media device, a first user interface defined and hosted by a first third-party media content provider, the first user interface displaying a first plurality of data streams provided by the first third-party media content provider that are available to be streamed to the media device, the first user interface displaying the first plurality of data streams in accordance with rules defined and hosted by the first third-party media content provider;
    displaying, on the media device, a second user interface defined and hosted by a second third-party media content provider, the second third-party media content provider being different from the first third-party media content provider, the second user interface displaying a second plurality of data streams provided by the second third-party media content provider that are available to be streamed to the media device, the second user interface displaying the second plurality of data streams in accordance with rules defined by the second third-party media content provider;
    receiving user input, at the media device, that selects, from the first user interface a first subset of the first plurality of data streams available to be streamed to the media device;
    receiving user input, at the media device, that selects, from the second user interface a second subset of the first plurality of data streams available to be streamed to the media device;
    based on the user input that selects the first and second subsets, generating a custom user interface for displaying the first subset of the first plurality of data streams and the second subset of the second plurality of data streams together within the custom user interface, the custom user interface being independent of the first and second user interfaces;
    displaying the custom user interface on the media device such that the first subset of the first plurality of data streams and the second subset of the second plurality of data streams are displayed together within the custom user interface and such that the determination of which data streams are displayed within the custom user interface is based on user interaction with the first and second user interfaces defined and hosted by the first and second third-party media content providers respectively;
    receiving user input that selects a first data stream of the data streams displayed in the custom user interface, the first data stream being provided by the first third-party media content provider; and
    commencing streaming of the first data stream without requiring the user to navigate to the first user interface and select the first data stream.

2. The method in accordance with claim 1, wherein the custom user interface is further configurable using a set of user defined rules that specify the look and feel of the custom user interface.

3. The method in accordance with claim 1, wherein the data streams are audio data streams.

4. The method in accordance with claim 1, wherein the data streams include audio and video data streams.

5. The method in accordance with claim 1, wherein the custom user interface also displays selected content available locally on the mobile media device.

6. The method in accordance with claim 1, wherein the first data stream comprises a satellite radio data stream.

7. The method in accordance with claim 1, wherein the data streams available to be streamed to the mobile media device include satellite data streams and internet data streams.

8. The method in accordance with claim 1, wherein the data streams available to be streamed to the mobile media device include satellite data streams, internet data streams, and terrestrial data streams.

9. The method in accordance with claim 1, further comprising:
    after the custom user interface has been generated, displaying a third user interface defined by a third third-party media content provider, the third user interface displaying a third plurality of data streams provided by the third third-party media content provider;
    receiving user input that selects a data stream of the third plurality of data streams; and
    automatically adding the selected data stream of the third plurality of data streams to the custom user interface.

10. The method in accordance with claim 1, wherein generating the custom user interface comprises:
    transmitting, to a service center, an indication of the selection of the first and second sub sets;
    receiving, from the service center, custom rules for displaying data streams in the custom user interface; and
    rendering the custom user interface in accordance with the custom rules.

11. The method in accordance with claim 1, wherein the user input that selects the first subset of the first plurality of data streams comprises user input that selects to stream the first subset of the first plurality of data streams via the first user interface.

12. One or more non-transitory computer readable media storing computer executable instructions which when executed by one or more processors implement a method for a media device from amongst the one or more media devices to generate a custom user interface configured to display selected data streams available to be streamed to the media device, the method comprising:
- displaying, on a media device, a first user interface defined and hosted by a first third-party media content provider, the first user interface displaying a first plurality of data streams provided by the first third-party media content provider that are available to be streamed to the media device, the first user interface displaying the first plurality of data streams in accordance with rules defined and hosted by the first third-party media content provider;
- displaying, on the media device, a second user interface defined and hosted by a second third-party media content provider, the second third-party media content provider being different from the first third-party media content provider, the second user interface displaying a second plurality of data streams provided by the second third-party media content provider that are available to be streamed to the media device, the second user interface displaying the second plurality of data streams in accordance with rules defined by the second third-party media content provider;
- receiving user input, at the media device, that selects, from the first user interface, a first subset of the first plurality of data streams available to be streamed to the media device;
- receiving user input, at the media device, that selects, from the second user interface, a second subset of the first plurality of data streams available to be streamed to the media device;
- based on the user input that selects the first and second subsets, generating a custom user interface for displaying the first subset of the first plurality of data streams and the second subset of the second plurality of data streams together within the custom user interface, the custom user interface being independent of the first and second user interfaces;
- displaying the custom user interface on the media device such that the first subset of the first plurality of data streams and the second subset of the second plurality of data streams are displayed together within the custom user interface and such that the determination of which data streams are displayed within the custom user interface is based on user interaction with the first and second user interfaces defined and hosted by the first and second third-party media content providers respectively;
- receiving user input that selects a first data stream of the data streams displayed in the custom user interface, the first data stream being provided by the first third-party media content provider; and
- commencing streaming of the first data stream without requiring the user to navigate to the first user interface and select the first data stream.

13. The computer readable media of claim 12, wherein the at least some of the data streams comprise video.

14. The computer readable media of claim 12, wherein at least some of the data streams comprise audio.

15. The computer readable media of claim 12, wherein at least some of the data streams are received via the internet.

16. The computer readable media of claim 12, wherein the first user interface comprises a web-based interface.

17. The computer readable media of claim 12, wherein the user input that selects the first subset of the first plurality of data streams comprises user input that selects to stream the first subset of the first plurality of data streams via the first user interface.

18. A computing device comprising:
- one or more processors; and
- memory storing computer executable instructions which when executed by the one or more processors perform a method for generating a custom user interface configured to display selected data streams available to be streamed to the computing device, the method comprising:
  - displaying, on a media device, a first user interface defined and hosted by a first third-party media content provider, the first user interface displaying a first plurality of data streams provided by the first third-party media content provider that are available to be streamed to the media device, the first user interface displaying the first plurality of data streams in accordance with rules defined and hosted by the first third-party media content provider;
  - displaying, on the media device, a second user interface defined and hosted by a second third-party media content provider, the second third-party media content provider being different from the first third-party media content provider, the second user interface displaying a second plurality of data streams provided by the second third-party media content provider that are available to be streamed to the media device, the second user interface displaying the second plurality of data streams in accordance with rules defined by the second third-party media content provider;
  - receiving user input, at the media device, that selects, from the first user interface, a first subset of the first plurality of data streams available to be streamed to the media device;
  - receiving user input, at the media device, that selects, from the second user interface, a second subset of the first plurality of data streams available to be streamed to the media device;
  - based on the user input that selects the first and second subsets, generating a custom user interface for displaying the first subset of the first plurality of data streams and the second subset of the second plurality of data streams together within the custom user interface, the custom user interface being independent of the first and second user interfaces;
  - displaying the custom user interface on the media device such that the first subset of the first plurality of data streams and the second subset of the second plurality of data streams are displayed together within the custom user interface and such that the determination of which data streams are displayed within the custom user interface is based on user interaction with the first and second user interfaces defined and hosted by the first and second third-party media content providers respectively;
  - receiving user input that selects a first data stream of the data streams displayed in the custom user interface, the first data stream being provided by the first third-party media content provider; and
  - commencing streaming of the first data stream without requiring the user to navigate to the first user interface and select the first data stream.

19. The computing device of claim 18, wherein the user input that selects the first subset of the first plurality of data streams comprises user input that selects to stream the first subset of the first plurality of data streams via the first user interface.

20. The computing device of claim 18, wherein at least some of the data streams are received via the internet.

* * * * *